United States Patent
Pasquale et al.

(10) Patent No.: US 8,650,130 B2
(45) Date of Patent: *Feb. 11, 2014

(54) SYSTEM AND METHOD FOR AUTOMATED CUSTOMER FEEDBACK

(75) Inventors: Theodore B. Pasquale, Austin, TX (US); Robert R. Bushey, Cedar Park, TX (US); Benjamin A. Knott, Round Rock, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 150 days.

This patent is subject to a terminal disclaimer.

(21) Appl. No.: 12/983,789

(22) Filed: Jan. 3, 2011

(65) Prior Publication Data

US 2011/0106586 A1    May 5, 2011

Related U.S. Application Data

(63) Continuation of application No. 10/436,743, filed on May 13, 2003, now Pat. No. 7,877,265.

(51) Int. Cl.
  *G06Q 10/00* (2012.01)
  *G06Q 30/00* (2012.01)

(52) U.S. Cl.
  USPC .......... 705/304; 705/14.19; 705/346

(58) Field of Classification Search
  USPC .............. 705/1.1, 14.19, 304, 346
  See application file for complete search history.

(56) References Cited

U.S. PATENT DOCUMENTS

| | | | |
|---|---|---|---|
| 5,537,618 A | 7/1996 | Boulton et al. | |
| 5,566,291 A | 10/1996 | Boulton et al. | |
| 5,940,471 A | 8/1999 | Homayoun | |
| 6,151,584 A | 11/2000 | Papierniak et al. | |
| 6,337,904 B1 | 1/2002 | Gisby | |
| 6,377,944 B1 | 4/2002 | Busey et al. | |
| 6,380,928 B1 | 4/2002 | Todd | |
| 6,389,400 B1 | 5/2002 | Bushey et al. | |
| 6,510,427 B1 | 1/2003 | Bossemeyer, Jr. et al. | |
| 6,650,736 B1 | 11/2003 | Unger et al. | |
| 2002/0124247 A1 | 9/2002 | Houghton | |
| 2003/0041056 A1 | 2/2003 | Bossemeyer, Jr. et al. | |

FOREIGN PATENT DOCUMENTS

| | | |
|---|---|---|
| JP | 2001-297259 | 10/2001 |
| JP | 2002-157445 | 5/2002 |
| JP | 2002-324124 | 11/2002 |

OTHER PUBLICATIONS

Office Action, Mexican Patent Application No. 5012181, May 19, 2008, 2 pages.
Office Action, European Patent Application No. 04 751 856.8, Jul. 23, 2007, 5 pages.
Office Action, Japanese Patent Application No. 2006-532937, Mar. 16, 2010, 3 pages.

*Primary Examiner* — Jami A Plucinski
*Assistant Examiner* — Sangeeta Bahl
(74) *Attorney, Agent, or Firm* — Jackson Walker L.L.P.

(57) ABSTRACT

A system and method for automated customer feedback allows for automatically collecting and analyzing customer feedback data regarding customer satisfaction and customer task completion with respect to self-service applications and live agents. When contacting a customer service center, customers provide one or more customer tasks. The customers are routed within the customer service center based on the customer task and/or one or more customer characteristics. While interacting with the customer service center, the customers are automatically asked one or more specific survey questions relating to the customers' interaction with the customer service center and the customers' satisfaction levels. The customers provide one or more survey responses to the survey questions. The survey responses are recorded and analyzed in order to modify and update the customer service center and the survey questions in order to increase customer satisfaction and increase customer task completion.

20 Claims, 3 Drawing Sheets

SYSTEM AND METHOD FOR AUTOMATED CUSTOMER FEEDBACK

TECHNICAL FIELD OF THE INVENTION

The present invention relates generally to telecommunication services, and more specifically relates to a system and method for automated customer feedback.

BACKGROUND OF THE INVENTION

Customers often call a company service call center or access a company's web page to perform a specific customer task such as change their address, pay a bill, alter their existing services, or receive assistance with problems or questions regarding a particular product or service. When calling, the customers may either speak with customer service representatives (CSR), also known as agents, or interact with an automated self-service application such as an interactive voice response (IVR) system. Because of the high costs associated with live service agents and because companies often do not employ enough agents to handle all the customers during peak customer calling times, companies are transitioning many of the customer tasks performed by agents to be primarily performed by the automated self-service applications. Therefore, the customers typically do not interact with a live person while performing the customer task when using the automated self-service applications. Because the customers do not interact with a live agent while performing customer tasks, the companies do not know if the customers actually accomplish their customer tasks and the satisfaction levels of customers. Therefore, many companies typically assume that the customers are completing customer tasks using the automated self-service applications and that the customers are satisfied whether or not the assumption is actually correct.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
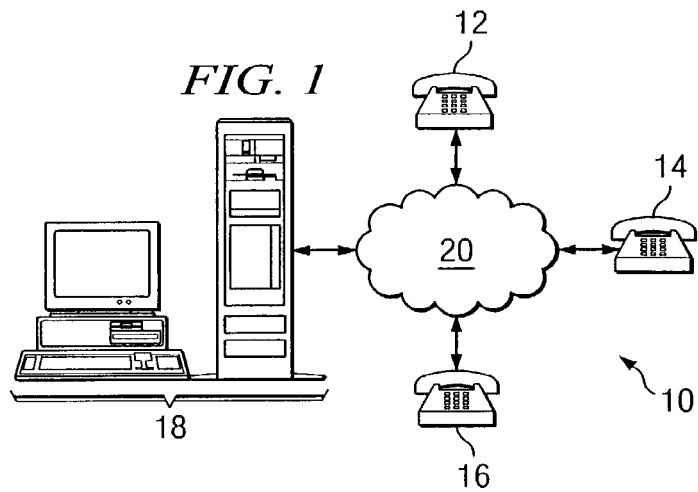
FIG. 1 depicts a schematic diagram of an example embodiment of a system for automated customer feedback.

Preferred embodiments of the present invention are illustrated in the figures, like numerals being used to refer to like and corresponding parts of the various drawings.

When customers call a customer service center or call center seeking to perform a customer task, the customers are increasingly interacting with an automated self-service application instead of live agents. An automated self-service application is a system consisting of a plurality of menus and user prompts designed and arranged in a hierarchical design. When a customer calls a customer service number or accesses a customer service web site, the customer is greeted with an automated system asking the customer to supply such information as the customer's account number or telephone number. The automated self-service application provides one or more options arranged in a menu to the customer and asks the customer to pick the option that most closely relates to the purpose of the customer's call. For example, the automated self-service application may ask the customer if the customer would like to pay a bill, alter their service, change their address, or learn about new products and services. The customer responds to the menu prompt by either speaking the response if the automated self-service application utilizes speech recognition technology or by touch tone response by pressing the number keys on the telephone. The automated self-service application continues providing menu prompts to the customer and the customer continues responding to the menu prompts until the customer is able to complete the customer's task and then the customer exits the automated self-service application.

Automated self-service applications reduce costs for companies because the customers are moved away from expensive live agents to inexpensive automated applications. In addition, self-service applications have the possibility of maintaining high customer task completion, increasing customer satisfaction, and shortening the average call duration in the customer call center if the customers are satisfied and accomplishing their customer tasks.

Typically, companies do not know if the customers have completed their customer tasks using the self-service applications and how satisfied the customers are using the self-service applications. Therefore, automated self-service applications are generally assumed to be successful in allowing the customers to accomplish their customer tasks and in creating a high level of customer satisfaction in the customers. But that is a major assumption considering how many companies are transitioning a majority of customer tasks to the self-service application away from the live agents and given the large volume of customer inquiries received by customer call centers. If customers are not satisfied using the self-service application and/or are not completing their customer tasks while using the self-service applications, then the self-service applications are actually creating unsatisfied customers and costing the companies additional money. Additional money spent by the companies in having to utilize expensive live agents to help the customers who are not completing customer tasks in the self-service application. Furthermore, because customers are having to interact with both the self-service application and live agents, calls are taking longer than customers typically expect. Therefore, customers may leave for competitors because of low levels of customer satisfaction and unnecessarily long call durations.

Occasionally, companies make an attempt to gather information regarding task completion and customer satisfaction regarding the self-service applications. Typically live agents ask the customers questions regarding customer task completion and customer satisfaction after a customer has interacted with a self-service application. But transferring the customer to an agent after the customer interacts with an automated system is an unreliable and inconsistent approach for determining customer task completion and customer satisfaction. Agents are not always available to ask the customer satisfaction questions when a customer completes a customer task in the self-service application. Furthermore, some customers may find it frustrating and unusual to perform a customer task using an automated self-service application and then be transferred to an agent to determine customer satisfaction and task completion. Customers may become frustrated or confused when the customer may have preferred to talk to an agent instead of the self-service application while performing the customer task and only gets to speak with an agent in order to answer a few questions regarding customer satisfaction. In addition, having agents record data regarding customer satisfaction and customer task completion often results in inconsistent and incomplete data due to human error and bias. For instance, each agent may ask the questions differently, record the answers differently, and use different scales when recording the customers' responses to the questions. In addition, some agents may only record the good or favorable responses and omit any negative or unfavorable responses thereby skewing the results. Furthermore, using agents is expensive and may be cost prohibitive to the company because of the high costs associated with agent time.

Instead of transferring the customer to an agent after the customer has completed a customer task using the self-service application, companies may also contact various customers one to four weeks after the customer inquiry and ask the customer numerous questions regarding customer task completion and customer satisfaction. But customers generally do not remember the details regarding a phone call they made one to four weeks ago and therefore cannot provide accurate responses to the questions. Furthermore, if a customer does remember any details it is usually because the customer had a negative experience and therefore the results are skewed towards only the negative experiences. In addition, many customers may find it bothersome to be called at home or work and be asked numerous questions regarding a phone call they do not remember.

By contrast, the example embodiment described herein allows for the automatic collection and analysis of customer feedback. The example embodiment allows for the collection of customer feedback upon completion by the customers of one or more customer tasks but before the customers terminate the inbound inquiry into the customer service center. Because the customers are automatically asked customer satisfaction or survey questions after completing or attempting to complete a customer task, the experience is fresh with the customers and therefore the customers are able to provide accurate and relevant customer feedback. Furthermore, since the agents are not involved in collecting the customer feedback, the costs associated with collecting customer feedback are reduced. The analysis of the customer feedback allows for the customer feedback to be incorporated into the self-service applications for improvement and allow for greater customer task completion and higher levels of customer satisfaction. The automated collection of customer feedback allows for customer feedback to be collected at a much higher rate than if manually collected by the agents. Therefore, the customer feedback collected is more accurate because it is drawn from a larger group of customers whereby the analysis of the customer feedback results in greater customer acceptance and satisfaction with respect to automated self-service applications.

Referring now to FIG. 1, a schematic diagram of an example embodiment of a system for automated customer feedback is depicted. Customer service system 10 includes three customer premise equipment 12, 14, and 16 and customer feedback system 18 with customer premise equipment 12, 14, and 16 in communication with customer feedback system 18 via network 20. Customer premise equipment (CPE), also known as subscriber equipment, include any equipment that is connected to a telecommunications network and located at a customer's site. CPEs 12, 14, and 16 may be telephones, 56 k modems, cable modems, ADSL modems, phone sets, fax equipment, answering machines, set-top box, POS (point-of-sale) equipment, PBX (private branch exchange) systems, personal computers, laptop computers, personal digital assistants (PDAs), SDRs, other nascent technologies, or any other appropriate type or combination of communication equipment installed at a customer's or caller's site. CPEs 12, 14, and 16 may be equipped for connectivity to wireless or wireline networks, for example via a public switched telephone network (PSTN), digital subscriber lines (DSLs), cable television (CATV) lines, IP telephony, or any other appropriate communications network. In the example embodiment of FIG. 1, CPEs 12, 14, and 16 are shown as telephones but in other embodiments may be any other appropriate type of customer premise equipment.

Telephones 12, 14, and 16 are located at the customer's premise. The customer's premise may include a home, business, office, or any other appropriate location where a customer may desire telecommunications services. Customer feedback system 18 is remotely located from telephones 12, 14, and 16 and is typically located within a company's customer service center or call center which may be in the same or different geographic location as telephones 12, 14, and 16. The customers or callers interface with customer feedback system 18 using telephones 12, 14, and 16. The customers and telephones 12, 14, and 16 interface with customer feedback system 18 and customer feedback system 18 interfaces with telephones 12, 14, and 16 through network 20. Network 20 may be a public switched telephone network, the Internet, a cable network, a wireless network, or any other appropriate type of communication network. Although only one customer feedback system 18 is shown in FIG. 1, in other embodiments customer feedback system 18 may serve alone or in conjunction with additional customer feedback systems located in the same customer service center or call center as customer feedback system 18 or in a customer service center or call center remotely located from customer feedback system 18. In addition, although three telephones 12, 14, and 16 are shown in FIG. 1, in other embodiments customer service system 10 may include more than three or less than three telephones.

Figure 2:
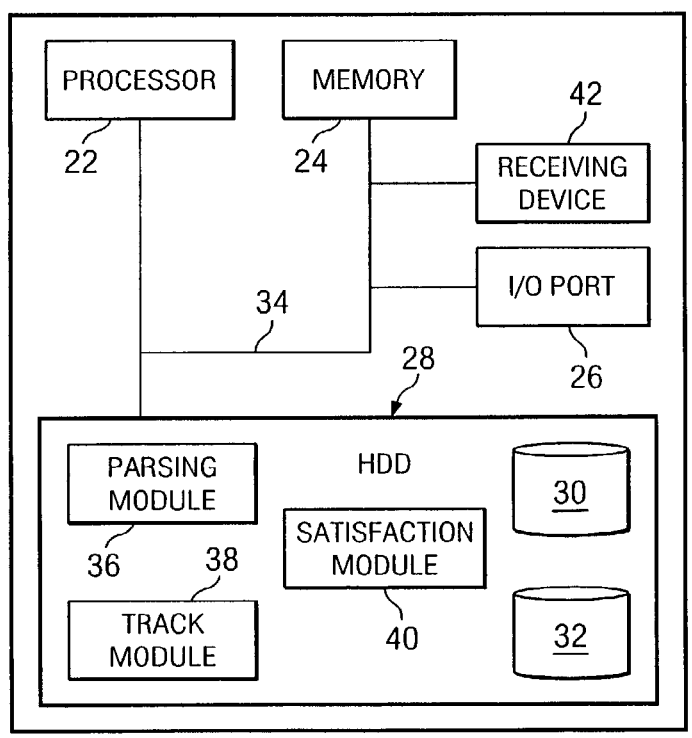
FIG. 2 illustrates a block diagram of an example customer service system.

FIG. 2 illustrates a block diagram of customer feedback system 18 in greater detail. In the example embodiment, customer feedback system 18 may include respective software components and hardware components, such as processor 22, memory 24, input/output ports 26, hard disk drive (HDD) 28 containing databases 30 and 32, and those components may work together via bus 34 to provide the desired functionality. In other embodiments, HDD 28 may contain more than two or less than two databases. The various hardware and software components may also be referred to as processing resources. Customer feedback system 18 may be a personal computer, a server, or any other appropriate computing device with a network interface for communicating over networks such as the telephone communication networks, the Internet, intranets, LANs, or WANs and located at a location remote from telephones 12, 14, and 16. Customer feedback system 18 also includes receiving device 42 as well as parsing module 36, track module 38, and satisfaction module 40, which reside in memory such as HDD 28 and are executable by processor 22 through bus 34. Customer feedback system 18 may further include an automated speech recognition (ASR) engine and a text to speech (TTS) engine that enable customer service system 10 to utilize a speech recognition interface with the customers on telephones 12, 14, and 16. The ASR engine allows customer feedback system 18 to recognize the speech or utterances provided by the customers in response to one or more prompts while the TTS engine allows customer feedback system 18 to playback to the customers in prompts variable data, such as data returned from a database search.

Receiving device 42 communicates with I/O ports 26 via bus 34 and in other embodiments there may be more than one receiving device 42 in customer feedback system 18 and customer service system 10. One such type of receiving device is an automatic call distribution system ("ACD") that receives plural inbound telephone calls and then distributes the inbound telephone calls to agents or automated systems. Another type of receiving device is a voice response unit ("VRU") also known as an interactive voice response system ("IVR"). When a call is received by a VRU, the caller is generally greeted with an automated voice that queries the caller for information and then routes the call based on the information provided by the caller. When inbound telephone calls are received, typically VRU and ACD systems employ identification means to collect caller information such as automated number identification ("ANI") information provided by telephone networks that identify the telephone number of the inbound telephone call. In addition, VRUs may be used in conjunction with ACDs to provide customer service.

Figure 3A:
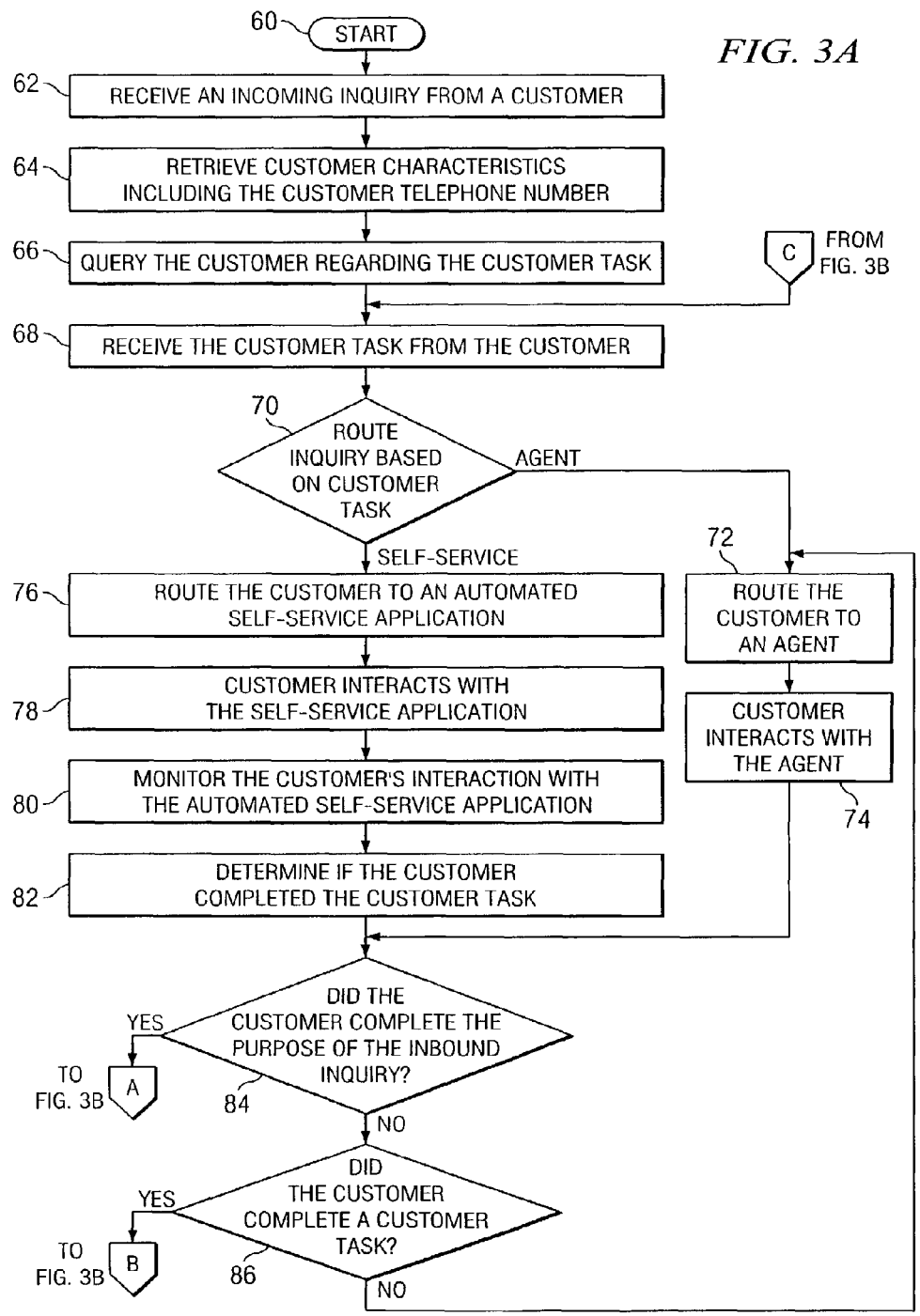
FIG. 3 depicts a flow diagram of an example embodiment of a method for automated customer feedback.
Figure 3B:
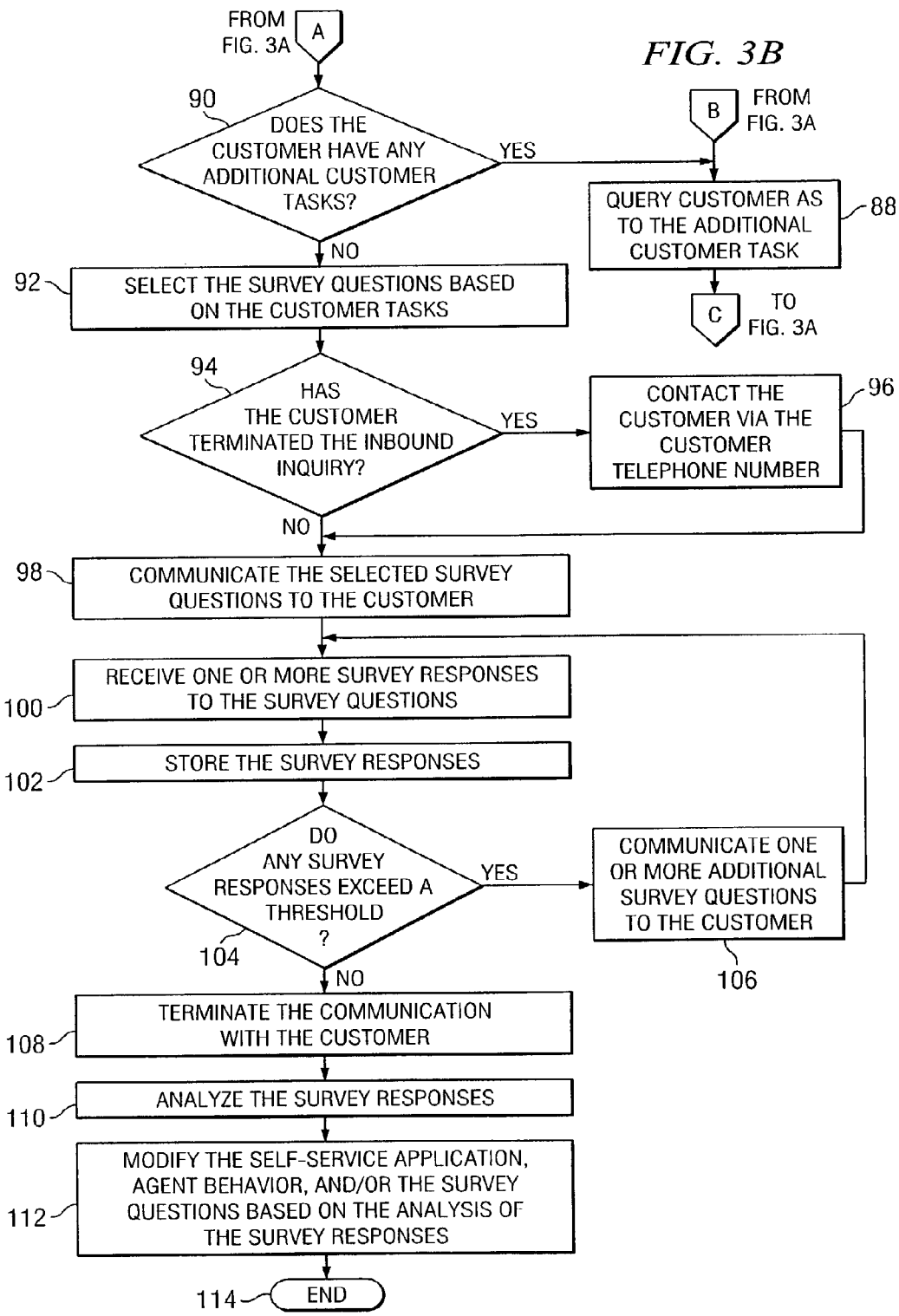

FIG. 3 illustrates a flow diagram of one embodiment of a method for automated customer feedback. The method allows for the automated collection and analysis of customer feedback. The method begins at step 60 and at step 62 receiving device 42 through I/O ports 26 receives one or more inbound inquires from one or more customers. The customers contact customer feedback system 18 via receiving device 42 over network 20 using telephones 12, 14, or 16 by calling a customer service telephone number. The customers may also access customer feedback system 18 by utilizing computers and the Internet by sending email or accessing a web site. In the embodiment shown in FIG. 3, the inbound inquiry is a telephone call but in other embodiments the inbound inquiry may be an email, an access of an Internet web site, instant messaging, or any other appropriate inbound inquiry into customer feedback system 18.

Once the customer's call has been received by receiving device 42, parsing module 36 queries the customer for customer identification information and retrieves one or more customer characteristics regarding the customer at step 64. Customer characteristics may include customer name, address, telephone number, account information, account status, account activity, customer status (premium or standard customer), and any other appropriate information regarding the customer. For example, parsing module 36 may ask the customer for the customer's name, telephone number, account number, or any other appropriate information that will assist parsing module 36 in the recognition of the customer. In other embodiments, parsing module 36 may utilize ANI in order to obtain the telephone number of the customer and thereby determine the identity of the customer. Parsing module 36 uses the customer identification information to search a database of customer information, such as database 30 or 32, in order to retrieve the customer characteristics of the calling customer.

At step 66 parsing module 36 queries the customer for the customer task. The customer task is the reason or purpose for the customer in contacting customer feedback system 18. For example, a customer task may be to pay a bill, update or change customer account information, modify the customer's service, request information on new products and service, or any other appropriate reason for contacting a customer service center. Parsing module 36 queries the customer for the customer task by asking the customer for the purpose of the call. If customer service system 10 is equipped with speech recognition technology, then the customer speaks the customer task. If customer service system 10 is not equipped with speech recognition technology or if the customer is not comfortable speaking responses, then the customer can provide the customer task through touch tone input. At step 68 parsing module 36 receives the customer task from the customer and stores the customer task in database 32.

After parsing module 36 receives the customer task from the customer, at step 70 parsing module 36 determines the correct routing for the inbound inquiry of the customer. When determining the correct routing, parsing module 36 may take into account only the customer task, only the customer characteristics, or a combination of the customer task and the customer characteristics. With respect to routing based on the customer task, some customer tasks may not be available with the automated self-service application. Therefore if a customer has a customer task that cannot be performed with the self-service application, then parsing module 36 routes the customer to an agent. But if the customer task can be performed within the self-service application, then parsing module 36 routes the customer to the self-service application. The routing of the inbound inquiry may also be affected by the customer characteristics. For example, a premium customer or a customer who has a history of spending a large amount of money may be routed directly to an agent and specifically to one of the top agents so that the customer will receive the best possible service. Furthermore, a premium customer may be routed to an agent even though the customer task for the premium customer is one that can be performed using the self-service application.

If at step 70 the customer is to be routed to an agent because of the customer task and/or the customer characteristics, then at step 72 parsing module 36 routes the customer to an agent and the customer interacts with the agent at step 74 whereby the agent assists the customer in completing the customer task. If an agent is not immediately available to speak with the customer, the customer holds in a queue until an agent becomes available to interact with the customer at step 74. Once the customer finishes interacting with the agent at step 74, the agent disconnects from the customer (the customer remains connected to customer feedback system 18) and parsing module 36 transfers the customer to step 84 to determine if the customer has completed the customer task and to potentially collect automated customer feedback as described below.

If at step 70 the customer is to be routed to the self-service application because of the customer task and/or the customer characteristics, then at step 76 parsing module 36 routes the customer to the self-service application and at step 78 the customer interacts with the self-service application. The customer interacts with the self-service application by responding to one or more menu prompts provided by the self-service application. The menu prompts ask questions of the customer and/or ask the customer for additional information thereby enabling the customer to navigate the hierarchical menu design of the self-service application in order to accomplish the customer task. While the customer interacts with the self-service application, at step 80 track module 38 monitors the customer's interaction and behavior within the self-service application. Track module 38 monitors and stores in database 32 each selection or response made by the customer when interacting with the self-service application as well as the customer's navigation of the menus within the self-service application.

Track module 38 has knowledge of the customer task supplied by the customer at step 66 from parsing module 36 and database 32. By comparing the customer task with the customer's progression within the self-service application including the menus navigated by the customer where particular menus are associated with completion of each customer task, track module 38 determines when a customer completes a customer task at step 82 and stores the completed task with an association to the customer along with a notation that the task was completed in the self-service application in database 32. For example, the customer has a customer task of paying a bill. Parsing module 36 routes the customer to the self-service application where the customer navigates the menus in order to arrive at a menu prompt where the customer is able to provide a credit card number in order to pay the bill. Track module 38 determines that the customer is attempting to pay a bill so when track module 38 detects that the customer has navigated to the menu prompt requesting the customer to provide a credit card number to pay a bill, track module 38 determines that the customer has completed the customer task when the customer provides the credit card number.

Once the customer completes or appears to complete a customer task at step 74 with an agent or at step 82 within the self-service application, satisfaction module 40 queries the customer regarding completion of the customer task at step 84. At step 84 satisfaction module 40 prompts the customer asking if the customer has completed the purpose or reason for the customer's query to the customer service center. If the customer responds at step 84 that the customer has not completed the reason for contacting customer feedback system 18, then at step 86 satisfaction module 40 communicates with track module 38 and searches database 32 in order to determine if the customer completed a customer task while interacting with either an agent or the self-service application. If at step 86 satisfaction module 40 determines that the customer has not completed a customer task, then track module 38 transfers the customer to step 72 so that the customer can interact with an agent in order to complete the customer task. At step 86 the customer is transferred to an agent instead of back into the self-service application when the customer has not completed a customer task at step 86 because typically the customer had been interacting with the self-service application and had not been able to complete the customer task using the self-service application. It would be very frustrating to the customer who was unsuccessful in completing the customer task using the self-service application to be transferred back to the self-service application to attempt for a second time to complete the customer task. Therefore, the track module 38 transfers the customer to an agent so that the agent can assist the customer in completing the customer task.

If at step 86 satisfaction module 40 determines from communicating with track module 38 and searching database 32 that the customer did complete a customer task either through interaction with an agent or the self-service application, then the customer must have more than one customer task for which the customer contacted customer feedback system 18. For instance, a customer may contact customer feedback system 18 needing to both pay a bill and update her account information and may only communicate pay a bill as the customer task at step 66. Therefore the customer interacts with the self-service application at step 78 and successfully pays her bill and track module 38 determines that the customer completed a customer task and notes the completion of the task. At step 84 when asked if the purpose of the call has been completed, the customer replies no because although the customer has successfully completed a customer task (paid her bill), the customer has an additional customer task to complete, here updating customer account information. Therefore, at step 88 parsing module 36 queries the customer for the additional customer task and routes the customer to either an agent or the self-service application depending on the customer task and/or the customer characteristics. The customer then interacts with customer service system 18 in order to accomplish the customer task as described above.

If at step 84 the customer has accomplished the purpose for contacting customer service system 18, then at step 90 satisfaction module 40 queries the customer regarding any additional customer tasks that need to be completed. A customer may decide that the reason for contacting customer service system 18 is complete at step 84 but then realize that there is one or more additional customer tasks to be completed. Or a customer having two customer tasks may interpret the query at step 84 as only referring to the first customer task and therefore answer affirmatively with respect to completing the reason for contacting customer service system 18 while still having one or more customer tasks to complete. If the customer has one or more additional customer tasks at step 90, parsing module 36 determines that the customer has already completed at least one customer task and therefore at step 88 parsing module 36 queries the customer as to the additional customer task and routes the customer to either an agent or the self-service application to complete the additional customer task as described above.

If at step 90 the customer has no additional customer tasks, the customer maintains the connection with customer feedback system 18 while satisfaction module 40 selects one or more survey questions to ask the customer with respect to the customer's experiences and satisfaction regarding interaction with either an agent or the self-service application at step 92. The survey questions are self-service dependent and agent dependent. For instance, a customer using the self-service application to complete his customer task is not asked any survey questions regarding interaction with an agent while a customer who interacts with an agent is not asked any survey questions relating to the self-service application. Furthermore, the survey questions are also task dependent. Therefore, a customer is asked questions relating to the actual customer task performed by the customer. For example, if the customer used the self-service application to pay a bill, the customer is not asked any survey questions regarding using the self-service application to update customer account information. In addition to being task dependent and self-service/agent dependent, the survey questions are also weighted so that responses to more heavily weighted survey questions may result in different routing or analysis versus the same response to survey questions not as heavily weighted.

Satisfaction module 40 selects the survey questions from database 30. All of the survey questions are stored in database 30 and are searchable by customer task as well as self-service application and agent. For instance, if the customer task at issue is payment of a bill using the self-service application, satisfaction module 40 searches database 30 for survey questions relating to the customer task of paying a bill using the self-service application. Furthermore, satisfaction module 40 typically selects three survey questions to ask of each customer. Three survey questions is a good number to ask the customers because asking three questions does not require too much of the customers' time and therefore the customers are more likely to listen to the survey questions and actually provide responses instead of just hanging up or becoming frustrated. In addition, asking three questions of each customer allows for large pool of customer feedback data for analysis purposes. In other embodiments, satisfaction module 40 may select more than three or less than three survey questions for each customer. Furthermore in other embodiments, the customers may be given the option of whether or not they want to answer the survey questions before satisfaction module 40 retrieves the appropriate survey questions. Therefore, if the customers do not want to hear and answer the survey questions, satisfaction module 40 does not waste resources searching for survey questions.

The survey questions ask the customers about their satisfaction levels with respect to their interaction with customer service system 18 as well customer task completion. Typically, the survey questions are based on the LICRA scale (1-5) where "1" is very satisfied and "5" is very dissatisfied. Three example survey questions are listed below:

Survey Question 1:
Did you accomplish your task today?
Press 1 for yes,
Press 2 if you partially completed your task,
Press 3 for no, you did not complete your task.
Press 9 to repeat this question.
Survey Question 2:
How satisfied were you with the touch tone system you used at the beginning of your call today?
Press 1 for Very Satisfied,
Press 2 for Satisfied,
Press 3 Neutral,
Press 4 for Dissatisfied,
Press 5 for Very Dissatisfied.
Press 9 to repeat this question.
Survey Question 3:
How satisfied were you with your overall experience today?
Press 1 for Very Satisfied,
Press 2 for Satisfied,
Press 3 Neutral,
Press 4 for Dissatisfied,
Press 5 for Very Dissatisfied.
Press 9 to repeat this question.

Once satisfaction module 40 selects the appropriate survey questions for the customer and the corresponding customer task, at step 94 satisfaction module 40 checks to see if the customer has terminated the inbound inquiry to customer service system 18. After completing the customer tasks, many customers will terminate the telephone call because the customers do not want to be bothered by answering a few survey questions or do not realize that there are survey questions to answer after they have completed the customer task. If a customer has terminated the inbound inquiry at step 94, then at step 96 satisfaction module 40 locates the customer's telephone number using ANI if the customer's telephone number has not already been determined using ANI and contacts the customer via the customer's telephone number and communicates the selected survey questions to the customer at step 98. In addition to the selected survey questions, satisfaction module 40 may also ask the customer survey questions relating to why the customer terminated the telephone call before being asked the survey questions. Furthermore, if the customer hangs up before completing a customer task while interacting with the self-service application, track module 38 monitors and records the customer hang up and using the customer telephone number retrieved using ANI, satisfaction module 40 contacts the customer and asks the customer survey questions relating to why the customer hung up before completing the customer task.

If the customer has not terminated the inbound inquiry at step 94, then at step 98 satisfaction module 40 communicates the selected survey questions to the customer. The customer provides one or more survey responses to the survey questions which are received by satisfaction module 40 at step 100 and stored in database 32 by satisfaction module 40 at step 102. The survey responses collected and stored by satisfaction module 40 relate to the customers' satisfaction with customer service system 18 as well as customer task completion regarding which tasks are being completed by the customers and which customers tasks are not being completed by the customers.

As stated above, each survey question has an assigned weighted value because some survey questions are of more importance than other survey questions and are therefore weighted more heavily. Each of the more heavily weighted survey questions has a threshold value for which if a survey response exceeds the threshold, additional action is taken by satisfaction module 40 to address the survey response above the threshold. For instance, a question relating to interacting with an agent may ask the customer how satisfied they were with the demeanor of the agent. Because knowing if agents are rude to the customers is very important to companies in the customer service business, this question may be weighted very heavily. A threshold for this question may be established at "Dissatisfied" so that a survey response of "dissatisfied" or "very dissatisfied" is above the threshold for this survey question. Therefore if the customer's survey response to this survey question is at or above the threshold, the customer may be asked additional questions regarding the behavior or demeanor of the agent or immediately transferred to an agent so that all the information may be gathered surrounding the behavior of the agent.

At step 104, satisfaction module 40 examines the survey responses with respect to the survey questions to determine if any of the survey responses exceed any thresholds values for any of the heavily weighted survey questions having a threshold value. If at least one of the survey responses exceeds at least one threshold value, then at step 106 satisfaction module 40 asks the customer additional survey questions relating to the survey question having a survey response at or above the threshold and then repeats steps 100, 102, and 104 until none of the of the survey responses exceed any threshold values and an adequate amount of data has been gathered by satisfaction module 40 regarding the survey questions above the thresholds. In other embodiments, the customer may be immediately transferred to an agent instead of being asked additional survey questions when at least one of the survey responses exceeds a threshold value.

Furthermore, in other embodiments the customer characteristics may affect how satisfaction module 40 responds to the survey responses at or above a threshold. If a customer is a premium customer and has one or more survey responses at or above a threshold, satisfaction module 40 may immediately transfer the premium customer to an agent so that the agent can immediately deal with any problems experienced by the premium customer whereas a non-premium customer having the exact same survey response may only be asked additional survey questions by satisfaction module 40. In addition, for premium customers the threshold values for the heavily weighted survey questions may be set at a lower value so that any slightly negative survey response results in an immediate transfer of the premium customer to an agent.

If at step 104 none of the survey responses exceed a threshold, then at step 108 the customer hangs up and terminates the telephone call with customer service system 18. Once the customer has terminated the telephone call, satisfaction module 40 analyzes the survey responses including customer task completion data stored in database 32 in order to determine any problems with the self-service application, any of the agents, or any of the survey questions. At step 112 satisfaction module 40 utilizes the analysis of the survey responses to modify and update the self-service application including altering menu designs to make it easier for customers to complete their customer tasks. The analysis of the survey responses can be used to locate one or more problems areas within the self-service application such as menus where customers get stuck or do not understand the menu prompts. In addition, the analysis of the survey responses may also be utilized to update and modify the survey questions so that the survey questions better capture information regarding customer task completion and customer satisfaction. Satisfaction module 40 may also make recommendations for ways for the agents to modify their behavior so that they are more appealing and friendly to the customers. Satisfaction module 40 continually analyzes the survey responses and makes modifications to increase customer satisfaction and increase customer task completion.

In other embodiments, survey questions may be asked of the customers after the customer have completed each customer task instead of waiting until the customers have completed all customer tasks before asking the survey questions. Furthermore, the survey questions may be asked of the customers at any stage within the interaction of the self-service application and not affect the customers' interaction with the self-service application. Even when the survey questions are asked at the completion of the call, the survey questions do not affect the interaction between the customer and customer feedback system 18.

It should be noted that the hardware and software components depicted in the example embodiment represent functional elements that are reasonably self-contained so that each can be designed, constructed, or updated substantially independently of the others. In other embodiments, however, it should be understood that the components may be implemented as hardware, software, or combinations of hardware and software for providing the functionality described and illustrated herein. In other embodiments, systems incorporating the invention may include personal computers, mini computers, mainframe computers, distributed computing systems, and other suitable devices.

Other embodiments of the invention also include computer-usable media encoding logic such as computer instructions for performing the operations of the invention. Such computer-usable media may include, without limitation, storage media such as floppy disks, hard disks, CD-ROMs, DVD-ROMs, read-only memory, and random access memory; as well as communications media such as wires, optical fibers, microwaves, radio waves, and other electromagnetic or optical carriers.

In addition, one of ordinary skill will appreciate that other embodiments can be deployed with many variations in the number and type of devices in the system, the communication protocols, the system topology, the distribution of various software and data components among the hardware systems in the network, and myriad other details without departing from the present invention.

Although the present invention has been described in detail, it should be understood that various changes, substitutions and alterations can be made hereto without departing from the spirit and scope of the invention as defined by the appended claims.

What is claimed is:

1. A method of improving caller satisfaction, the method comprising:
   routing, by an interactive voice response system, a call by a caller to an automated self-service application including a user interface menu presented to the caller;
   before terminating the call, presenting to the caller a set of survey questions concerning interaction of the caller with the self-service application;
   receiving from the caller a response to a question included in the set of survey questions; and altering, by the interactive voice response system, the user interface menu based on the response.

2. The method of claim 1, wherein the question included in the set of survey questions is based on a task, indicated by the caller, associated with the call.

3. The method of claim 1, further comprising obtaining caller identification information and using the caller identification information to retrieve caller characteristics.

4. The method of claim 3, wherein the caller characteristics include account activity information.

5. The method of claim 1, wherein the question included in the set of survey questions asks the caller to indicate a level of caller satisfaction.

6. The method of claim 5, wherein the level of caller satisfaction is selected from a set of defined satisfaction levels.

7. The method of claim 1, further comprising, responsive to determining that the response exceeds a threshold value, asking the caller additional survey questions.

8. A method of improving caller satisfaction, the method comprising:
   routing, by an interactive voice response system, an inbound inquiry from a caller, based on a task indicated by the caller, to an automated self-service application including a user interface menu presented to the caller;
   before terminating the inbound inquiry, asking the caller a set of survey questions regarding the automated self-service application;
   receiving from the caller a response to at least one of the survey questions; and
   updating, by the interactive voice response system, the set of survey questions based at least in part on the response.

9. The method of claim 8, further comprising storing the response in a database.

10. The method of claim 8, further comprising obtaining caller identification information and using the caller identification information to retrieve caller characteristics.

11. The method of claim 10, wherein the caller characteristics include account activity information.

12. The method of claim 10, wherein the caller characteristics include caller status information indicative of a premium status of the caller.

13. The method of claim 10, wherein routing the call comprises routing the call based at least in part on the caller characteristics.

14. The method of claim 8, further comprising using automated number identification to determine the identity of the caller and using the identity to retrieve caller characteristics.

15. A computer non-transitory readable storage medium including processor executable instructions that, when executed by the processor, cause the processor to perform operations comprising:
   routing a call by a caller to an automated self-service application including a user interface menu presented to the caller;
   before terminating the call, asking the caller a set of survey questions concerning interaction of the caller with the self-service application;
   receiving from the caller a response to a question included in the set of survey questions; and based on the response, altering the user interface menu.

16. The non-transitory computer readable storage medium of claim 15, wherein the operations include selecting a question included in the set of survey questions based on a task, indicated by the caller, associated with the call.

17. The non-transitory computer readable storage medium of claim 15, wherein the operations include obtaining caller identification information and using the caller identification information to retrieve caller characteristics.

18. The non-transitory computer readable storage medium of claim 17, wherein the caller characteristics include account activity information.

19. The non-transitory computer readable storage medium of claim 15, wherein a question included in the set of survey questions asks the caller to indicate a level of caller satisfaction and wherein the level of caller satisfaction is selected from a set of defined satisfaction levels.

20. The non-transitory computer readable storage medium of claim 15, wherein the operations include asking the caller additional survey questions responsive to determining that the response exceeds a threshold value.

* * * * *